No. 882,712. PATENTED MAR. 24, 1908.
H. A. PIKE.
COFFEE POT.
APPLICATION FILED MAR. 1, 1907.
2 SHEETS—SHEET 1.
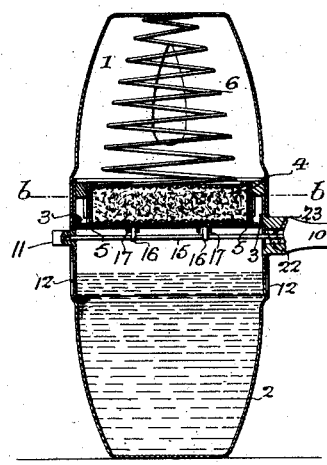
Fig.1.
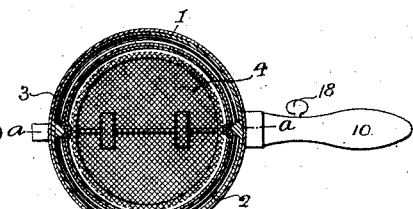
Fig.2.
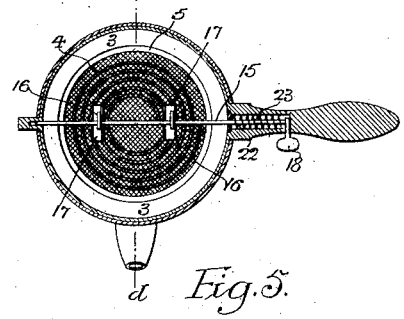
Fig.3.
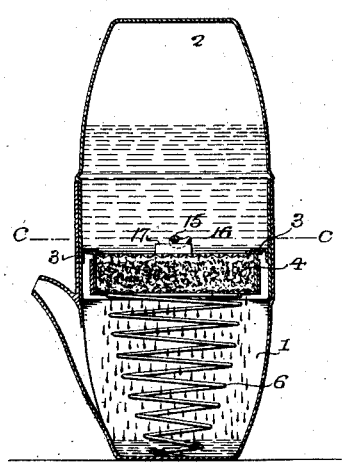
Fig.4.
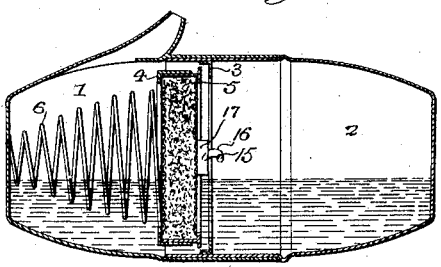
Fig.5.
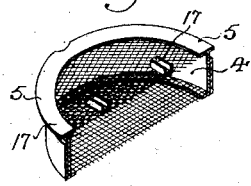
Fig.6.
Fig.7.
Witnesses:
Inventor
Harvey A. Pike.
by his Attorneys,
Howson & Howson No. 882,712. PATENTED MAR. 24, 1908.
H. A. PIKE.
COFFEE POT.
APPLICATION FILED MAR. 1, 1907.
2 SHEETS—SHEET 2.
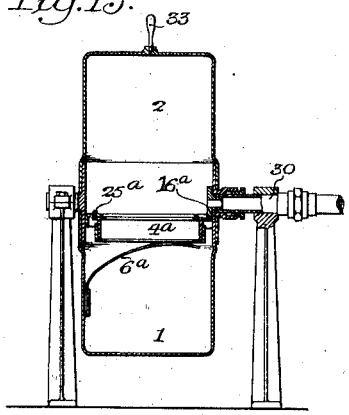
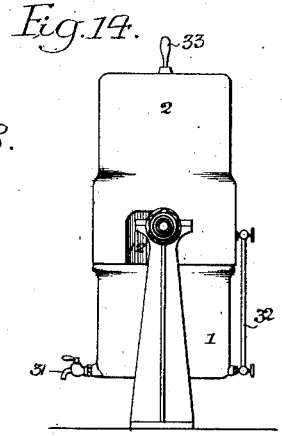
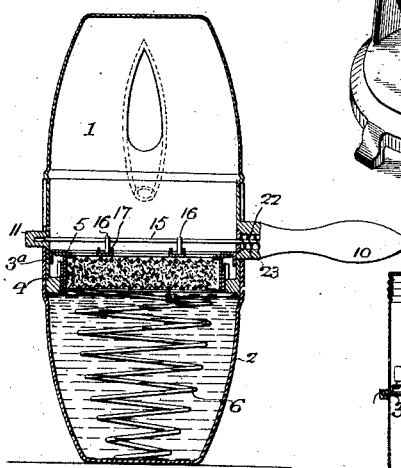
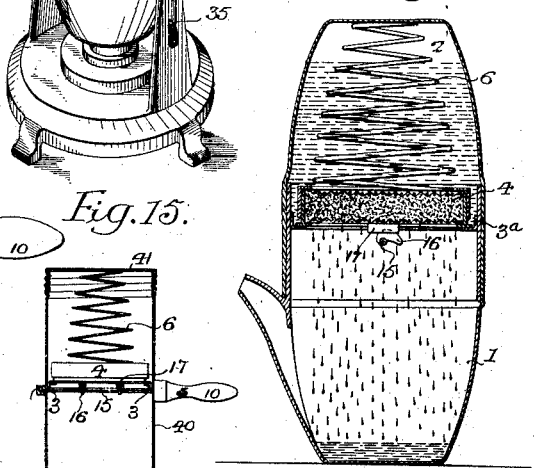
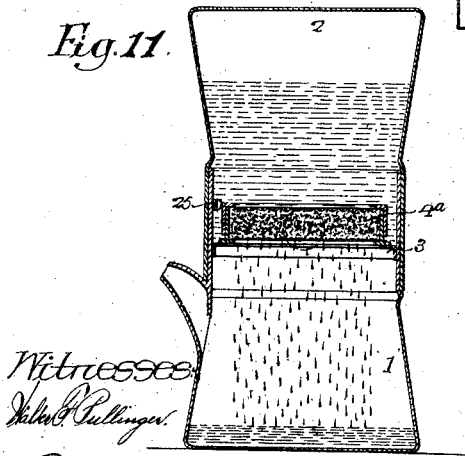
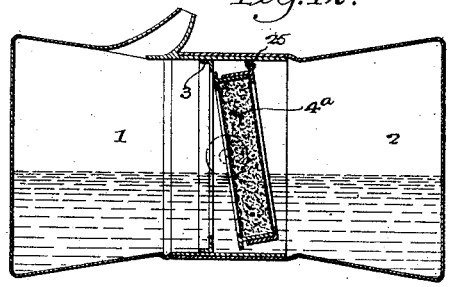
Inventor:—
Harvey A. Pike.
by his Attorneys,

UNITED STATES PATENT OFFICE.

HARVEY A. PIKE, OF NEW YORK, N. Y.

COFFEE-POT.

No. 882,712.  Specification of Letters Patent.  Patented March 24, 1908

Application filed March 1, 1907. Serial No. 360,099.

*To all whom it may concern:*

Be it known that I, HARVEY A. PIKE, a citizen of the United States, and a resident of New York city, New York, have invented certain Improvements in Coffee-Pots, of which the following is a specification.

My invention relates to that class of coffee pots in which the ground or pulverized coffee is placed in a suitable container to be mounted in one chamber or compartment of the coffee pot wherein hot water is provided to percolate through such coffee and drip into another chamber or compartment from which it can be poured as desired. More or less difficulty has been experienced in the use of coffee pots of this character by reason of the fact that it has been impossible to regulate the passage of the water through the coffee; to stop the drip action, or to speedily transfer the coffee extract, or the water, as the case may be, from one chamber or compartment to the other, for the purpose, in one instance, of permitting it to again pass through the coffee in the container, and in the other, of weakening the coffee extract which has previously passed through.

The object of my invention is to equip a coffee pot of this general character, having two internal chambers or compartments with means whereby the water, or the coffee extract, may be transferred from one chamber to the other at will. Such equipment includes a movable coffee container arranged normally to seat upon a shoulder in one of the chambers or compartments forming the complete structure, but so disposed as to be capable of movement independent of the structure whereby it can be temporarily dislodged from such seat for the purpose of transferring the liquid from either chamber or compartment to the other.

My invention is fully shown in the accompanying drawings, in which:

Figure 1, is an inverted sectional view of a coffee pot made in accordance with my invention, taken on the line $a$—$a$, Fig. 2; Fig. 2, is a sectional plan view, taken on the line $b$—$b$, Fig. 1; Fig. 3, is a sectional plan view, taken on the line $c$—$c$, Fig. 4; Fig. 4, is a sectional view of the coffee pot in the upright or normal position of use, taken on the line $d$—$d$, Fig. 3; Fig. 5, is a vertical section of the coffee pot, showing the same in a horizontal position; Fig. 6, is a sectional perspective view of the coffee container; Fig. 7, is a perspective view of the handle of the coffee pot, showing means carried thereby for operating the coffee container; Fig. 8, is a perspective view of the coffee pot mounted in a supporting stand carrying the usual heating means; Fig. 9, is an inverted sectional view, similar to Fig. 1, illustrating a modification of my invention; Fig. 10, is a sectional view of the pot shown in Fig. 9, in the upright or normal position of use; Fig. 11, is a sectional view of a coffee pot illustrating a further modification of my invention; Fig. 12, is a sectional view of the coffee pot shown in Fig. 11, in a horizontal position; Fig. 13, is a sectional view, on a greatly reduced scale, of a coffee pot designed to furnish a large quantity of the coffee extract suitable for restaurant or hotel use; Fig. 14, is an external view of the coffee pot shown in Fig. 13, and Fig. 15, is a sectional view showing a still further modified form of coffee pot.

As I have noted, the object of my invention is to provide means, in connection with the so-termed "drip coffee pots," that will enable me to transfer the liquid in the chambers or compartments of the coffee pot from one to the other as may be desired, such means including a movable receptacle for the ground or pulverized coffee.

In Figs. 1, 2, 3, 4 and 5, 1 represents the lower section of a coffee pot made in accordance with my invention, and 2 the upper section. In this instance the upper section is provided with a shoulder 3, and a container 4 for the ground or pulverized coffee rests upon a seat formed by this shoulder. The coffee container has a rim 5 for contact with this seat, and the latter may be provided with suitable packing whereby a substantially liquid-tight joint is provided, insuring that when the structure is assembled and water is placed in the chamber or compartment above the coffee container, such water will pass through said coffee and will not leak around the rim of said container.

To maintain the coffee container in its relative position with respect to the upper and lower compartments or chambers 1 and 2, I provide a spring 6 mounted in the lower compartment or chamber and adapted to engage the coffee container thereby holding it to its seat and insuring that the joint thus made will be practically liquid-tight at all times. When made in the form of two receptacles, the coffee pot is secured together by means of a bayonet-joint connection of ordinary construction, one section carrying a handle 10, and a stud or pin 11 projecting from the wall of such section opposite said handle, and the other section being notched at 12 to slip over these projections.

The handle 10 of the coffee pot, preferably of the character shown, is provided with means, extending from the same into the coffee pot, for moving the coffee container from its seat to permit the transfer of the liquid from one chamber or compartment to the other. Such means comprise a rod 15 centrally guided in said handle and journaled at the opposite side of the structure in the pin 11. This rod carries a cam or cams 16, arranged to engage guide plates 17 secured to the underside of the coffee container, said cams being adapted, when said rod is turned, to move said coffee container a sufficient distance from its seat to permit the passage of the liquid past the same. At the outer end of said rod, a thumb-piece 18 is provided; the handle 10 being slotted at 19 to receive and permit movement of the same, and such slot is provided with seats 20 and 21, the former receiving the stem of the thumb-piece when the container is in the normal seated position, and the latter receiving the thumb-piece after the container has been moved away from its seat. The handle is hollowed at 22, and a coiled spring 23 is mounted therein to impart slight longitudinal movement to said rod so that the thumb-piece will be held to its seats when the container is in either of the positions shown.

In the form of structure shown in Figs. 1, 2, 3, 4 and 5, the spring 6 is arranged to engage the container from underneath, such spring being disposed in the chamber or compartment from which the coffee extract is poured. In this case, the coffee container is supported from below against the seat 3 carried by the upper section.

In Figs. 9 and 10, I have shown a form of coffee-pot in which the coffee container is supported by a shoulder $3^a$ carried by the lower section. In this form of structure, the spring 6 is disposed in the upper chamber or compartment.

In the structure shown in Figs. 11 and 12, I have provided a swinging container $4^a$ for the ground or pulverized coffee. The container in this instance is hinged at 25, such hinge being readily separable when it is desired to remove the container. In this instance, the container is held to its seat by the weight of the coffee and the water above it. This structure is made with an enlarged bottom so that it may be placed upon an ordinary cook-stove instead of the usual alcohol lamp.

The coffee pots just described are mainly intended for individual use, and the amount of coffee extract capable of production therein is relatively small. For use upon café or restaurant bars where it becomes desirable to make a large quantity of coffee extract, I may provide a greatly enlarged structure such as is illustrated in reduced scale in Figs. 13 and 14, mounted upon trunnions, one of which consists of a pipe 30 to convey hot water for action upon the ground or pulverized coffee to provide the desired extract therefrom. In lieu of a pouring spout, this style of coffee pot will be provided with a spigot 31 and in order that the quantity of extract within the receptacle may be known, I provide a usual form of water-glass, as indicated at 32. In this structure the coffee container $4^a$ is hinged at $25^a$ so as to be movable therein, being normally held in position by a spring $6^a$, and a cam $16^a$ is mounted upon the end of the water pipe 30 within the structure whereby upon reversing the position of such structure, the cam being fixed, will move the coffee container against the action of the spring $6^a$ until the liquid flows from one end of the same to the other, and then upon giving the structure a full reverse movement it will be brought to its normal position; all of the liquid having been during such action transferred to the chamber or compartment that is normally in the upper position. This structure is preferably provided with a handle 33 to assist in turning the same.

When commencing to make the coffee extract, the sections of the coffee pot are separated, and then the coffee container is filled and placed in the proper position after the water that is to percolate through the same has been placed in the upper chamber or compartment. The two halves of the structure are then fastened together, making sure that the shifting structure carried by the handle is in such position that the coffee container can be held to its seat. After the sections are fastened, the position of the coffee pot is reversed, and then set in the frame or holder as shown in Fig. 8, and the heating apparatus of the same lighted. If the pot is of the character shown in Figs. 11 and 12, it may be placed upon an ordinary cook-stove. When in the frame or holder, the handle forms a means of support on one side, while on the other, the pin 11 is seated in the opposite hook. To maintain the coffee pot in the normal position with the water dripping through the container into the pouring chamber or compartment, the holder shown in Fig. 8, is provided with a spring catch 35, passing through one of the side legs and engaging a projection on the side of the coffee pot.

The water will percolate through the coffee in the container as indicated in the drawings. Should it be desired to weaken the coffee, for any purpose, after the water has started to percolate through, it is only necessary to operate the thumb-piece of the handle, causing the cams to engage the coffee container cles detachably connected together, and a coffee container carried by said receptacles and mounted so as to be capable of movement with respect to the same when they are in assembled condition.

4. The combination of a pair of liquid holding receptacles detachably connected together, one of said receptacles having a pouring spout, and a coffee container carried by said receptacles and mounted so as to be capable of movement with respect to the same when they are in assembled condition.

5. The combination of a pair of receptacles detachably connected together, a coffee container carried by the same, and means carried by said receptacles for moving said container relatively thereto when the receptacles are in their assembled condition.

6. The combination of a pair of liquid holding receptacles detachably connected together, one of said receptacles having a pouring spout, a coffee container mounted within and disposed between said receptacles, and means for moving said container relatively to the receptacles when the latter are in their assembled condition.

7. The combination of a pair of receptacles detachably connected together, a seat carried by one of said receptacles, a coffee container normally resting on said seat but capable of movement therefrom relatively to said receptacles while the latter are in their assembled condition, means for holding said container to its seat, and means for moving the container from its seat.

8. The combination in a coffee pot, of a lower receptacle, an upper receptacle, a coffee container relatively fixed between said receptacles but capable of movement with relation to said receptacles while the latter are in the assembled condition, and means for moving the container from its seat.

9. The combination of a pair of receptacles detachably connected together, a seat carried by one, a coffee container normally resting on said seat but capable of movement therefrom, means for preventing rotative movement of the container, and means for holding said container to its seat.

10. The combination in a coffee pot, of a lower receptacle, an upper receptacle, a coffee container relatively fixed between said receptacles but capable of vertical movement therein, and means for preventing rotative movement of the container.

11. The combination in a coffee pot, of a lower receptacle, an upper receptacle secured thereto, a coffee container mounted in one of said receptacles and having a substantially liquid-tight joint with the same, and means for moving said container relatively to said receptacles while the latter are in the assembled condition.

12. The combination in a coffee pot, of a lower receptacle, an upper receptacle, a coffee container disposed in one of said receptacles, and means within the coffee pot and operable from the exterior of the same for lifting said container from its seat.

13. The combination in a coffee pot, of a lower receptacle, an upper receptacle secured thereto, a coffee container mounted in one of said receptacles, a seat carried thereby and providing a substantially liquid-tight joint for the container, and means for moving said container from its seat while said receptacles are in the assembled condition.

14. The combination in a coffee pot, of a lower receptacle, an upper receptacle, a coffee retainer disposed in one of said receptacles, a handle for the coffee pot, and means controlled from said handle for engagement with said container to lift the same from its seat.

15. The combination in a coffee pot, of a lower receptacle, an upper receptacle, a coffee container disposed in one of said receptacles, a handle carried by one of said receptacles, and means carried by said handle for imparting movement to the container.

16. The combination in a coffee pot, of an upper receptacle, a lower receptacle, a coffee container mounted in one of said receptacles, the latter having a shoulder against which said container is seated in substantially liquid-tight position, said container being mounted so as to be movable with respect to said receptacles while the latter are in their assembled condition, means carried by one of said receptacles for holding the container to its seat, and means for moving said container from its seat.

17. The combination in a coffee pot, of a lower receptacle, an upper receptacle, a coffee container disposed in one of said receptacles, a handle carried by one of said receptacles, a rod journaled in said handle, and cams carried by said rod for imparting movement to the container.

18. The combination in a coffee pot, of an upper receptacle, a lower receptacle, a coffee container mounted in one of said receptacles, the latter having a shoulder against which said container is seated in substantially liquid-tight position, means carried by one of the receptacles for holding said container to its seat, a handle carried by the coffee pot, a rod journaled in said handle, cams carried by said rod in engagement with the container, and means carried by said handle whereby the cams may be actuated to move the container from its seat.

19. The combination in a coffee pot, of an upper receptacle, a lower receptacle, a coffee container mounted in one of said receptacles, the latter having a shoulder against which said container is seated in substantially liquid-tight position, said container being mounted so as to be movable with respect to the receptacles when the latter are in the and move the latter from its seat. When this is done, the water in the upper chamber or compartment will flow directly into the lower chamber or compartment, without first passing through the coffee. In the same way, should it be desired to have a stronger cup of coffee than ordinarily prepared, the coffee extract may be re-introduced into the upper receptacle for further passage through the coffee in the container. This may be done by moving the container from its seat in the manner described, and then turning the coffee pot as shown in Figs. 5 and 12, making sure in every instance that the spout is in the uppermost position. When the coffee pot has been entirely inverted, the water will be in the upper receptacle and by releasing the thumb piece, the container will be released, and can resume its seat, so that when the coffee pot is again placed in the normal position, the coffee extract will be compelled to flow back through the coffee in such container. This method also insures the return of any fine particles that may have first passed through the coffee back to the upper receptacle, where it will be caught on top of the container and prevented from being poured with the final extract. This turning action may be readily accomplished when the coffee pot is mounted in a stand such as shown in Fig. 8, and to insure the return of the container to the normal position, such stand is provided with a projection 36 arranged to engage the thumb-piece 18 when the coffee pot is fully inverted, so as to return the container to its seat before moving the coffee pot back to its normal position.

In the structure shown in Figs. 13 and 14, although it may be desirable in some instances, it is not necessary to fill one of the chambers with water before commencing operations, as such water may be delivered from the pipe 30 as desired.

Instead of having a duplex-receptacle structure such as I have illustrated in Figs. 1 to 14, inclusive, I may provide a coffee pot of the smaller size, illustrated in reduced scale in Fig. 15, comprising a single receptacle 40 with a removable cap 41 closing one end of the same, such cap carrying the coiled spring 6 whereby the coffee container 4 is maintained in its proper relative position upon a seat 3 within the receptacle; the latter being of such size as to permit the ready introduction of the coffee container thereto or its removal therefrom, and having the usual handle 10 provided with the means described with reference to the other figures for moving such container from its seat against the pressure of the spring, to permit the transfer of the liquid from one chamber of the receptacle to the other. In some instances the coffee container used with this structure may be connected to the spring, the latter having a slip connection with the cap so that in screwing the latter in place the container will be maintained in proper position with respect to the cams 16. In all other respects this form of coffee pot is constructed and operated in a manner similar to that indicated with respect to the other structures except that if the container is carried by the cap, the water will be placed originally in the lower chamber and then shifted after the container and cap have been secured in place.

As the coffee in the container is liable to swell under the action of the water, such container consists simply of two shells fitting each other substantially tight, but free to move under the pressure exerted by such swelling. The spring 6 engages one of these sections and will permit the same to separate as the coffee swells, without loss of the coffee or disarrangement of the coffee container within the coffee pot.

In order that the coffee container may be properly positioned when inserted in the coffee pot, its side walls are grooved, and the inner wall of the coffee pot is provided with lugs, of different shape, to engage said grooves.

It will be seen that the several sections of the various forms of coffee pots embodying my invention may be readily taken apart, and the parts separated for cleaning purposes; that there is no danger of leakage or improper action, and that by having a movable container for the coffee, I may make weak or strong coffee as desired; transferring the coffee extract, or the water, bodily, from one receptacle to the other as may be necessary for such purpose.

While it has been assumed that water in a heated condition will be placed in one compartment or the other of the coffee pot for percolation through the ground or pulverized coffee in the container, it will be understood that in many, if not all, instances, cold water might be placed in one compartment and heated therein by the means suggested, while the pot is in the inverted position, such water, after the pot has been placed in upright position, percolating through the coffee.

I claim:

1. A coffee pot having a pair of chambers or compartments adapted to contain liquid and separated by a body of pulverized or ground coffee, and means for quickly transferring the liquid within the coffee pot bodily from one chamber or compartment to the other about the body of coffee.

2. A coffee pot having a pair of separate chambers or compartments adapted to contain liquid, a coffee container disposed between said chambers and cutting off free communication from one to the other, and means for transferring liquid bodily within the coffee pot from one chamber to the other about such container.

3. The combination of a pair of receptaassembled condition, a spring mounted in one of the receptacles and engaging the end wall of the same for holding said container to its seat, and means for moving said container from its seat.

20. The combination in a coffee pot, of an upper receptacle, a lower receptacle, a coffee container mounted in one of said receptacles, the latter having a shoulder against which said container is seated in substantially liquid-tight position, means carried in one of the receptacles for holding said container to its seat, a handle carried by the coffee pot, a rod journaled in said handle, cams carried by said rod, means carried by the container for engagement by said cams, a thumb-piece carried by the handle for turning the rod to cause the cams to move the container and seats in the handle for said thumb-piece.

21. A coffee container for use in coffee pots of the character described, comprising two half shells or sections in frictional engagement with each other, said container being mounted so as to be movable with respect to the coffee pot in which it is disposed, and means for moving said container, the latter carrying engaging and guiding means for coöperation with such moving means.

22. A coffee container for use in coffee pots of the character described, comprising two half shells or sections in frictional engagement with each other, said container being mounted so as to be movable with respect to the coffee pot in which it is disposed, and means for moving said container, the latter carrying engaging and guiding means for coöperation with such moving means and a flange for seating in one of the receptacles of the coffee pot.

23. The combination of a coffee pot, a coffee container mounted therein, said container comprising two half sections or shells in frictional engagement with each other and capable of enlargement under the swelling action of the coffee contained therein, a seat within the coffee pot for said container, a flange carried by the container and resting on said seat, and a spring carried within said coffee pot and serving to hold the sections of said container together, the separation of the same due to the swelling action of the coffee being directed against the pressure of said spring.

24. The combination of a coffee pot, a coffee container mounted therein, said container comprising two half sections or shells in frictional engagement with each other and being capable of enlargement under the swelling action of the coffee contained therein, and a spring mounted between said container and one of the end walls of the coffee pot for holding the sections of said container together.

In testimony whereof, I have signed my name to this specification, in the presence of two subscribing witnesses.

HARVEY A. PIKE.

Witnesses:
MURRAY C. BOYER,
JOS. H. KLEIN.